United States Patent
Umeda et al.

(10) Patent No.: US 8,064,547 B2
(45) Date of Patent: Nov. 22, 2011

(54) RECEIVING APPARATUS AND METHOD

(75) Inventors: Toshiyuki Umeda, Inagi (JP); Shoji Otaka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 643 days.

(21) Appl. No.: 12/179,052

(22) Filed: Jul. 24, 2008

(65) Prior Publication Data

US 2009/0046817 A1 Feb. 19, 2009

(30) Foreign Application Priority Data

Jul. 26, 2007 (JP) ................................. 2007-194825

(51) Int. Cl.
*H04L 27/06* (2006.01)
(52) U.S. Cl. ......... 375/340; 375/316; 375/327; 375/342
(58) Field of Classification Search .................. 375/340, 375/316, 327, 342
See application file for complete search history.

(56) References Cited

U.S. PATENT DOCUMENTS

| | | | | |
|---|---|---|---|---|
| 4,695,931 A | * | 9/1987 | Yamaura et al. | 363/8 |
| 5,619,134 A | * | 4/1997 | Watanabe et al. | 324/225 |
| 5,789,985 A | * | 8/1998 | Yamauchi et al. | 331/1 A |
| 6,337,886 B1 | * | 1/2002 | Asahi | 375/316 |
| 6,470,393 B1 | * | 10/2002 | Heinrich et al. | 709/238 |
| 7,242,658 B2 | * | 7/2007 | Hwang | 369/59.19 |

FOREIGN PATENT DOCUMENTS

JP 2003-348059 12/2003

OTHER PUBLICATIONS

U.S. Appl. No. 12/331,895, filed Dec. 10, 2008, Umeda, et al.

* cited by examiner

*Primary Examiner* — Kenneth Lam
(74) *Attorney, Agent, or Firm* — Oblon, Spivak, McClelland, Maier & Neustadt, L.L.P.

(57) ABSTRACT

A receiving apparatus includes a unit detecting a specific-bit sequence included in a data sequence, a unit counting, as a count value $n_1$, a first number of oscillations during a 1-bit-wide period of a first bit of the specific-bit sequence, and to count, as a count value $n_2$, a second number of oscillations during a 1-bit-wide period of a second bit of the specific-bit sequence, a unit generating, when it is determined that the $n_1$ is not less than the ($n_2-a$) and is not more than the ($n_2+a$) ($a=1,2,\ldots$), a timing of $n_1/2$, fractions of which are carried, for the first bit to a third bit of the specific-bit sequence, and to generate a timing of $n_1$ for a fourth bit and subsequent bits, and a unit acquiring a data sequence from the data sequence at the timing $n_1/2$ and the timing $n_1$.

16 Claims, 4 Drawing Sheets

RECEIVING APPARATUS AND METHOD

CROSS-REFERENCE TO RELATED APPLICATIONS

This application is based upon and claims the benefit of priority from prior Japanese Patent Application No. 2007-194825, filed Jul. 26, 2007, the entire contents of which are incorporated herein by reference.

BACKGROUND OF THE INVENTION

1. Field of the Invention

The present invention relates to a receiving apparatus and method, which perform reception using a clock signal having no correlation with the data rate or phase of a signal to be received.

2. Description of the Related Art

As an example of the conventional asynchronous signal receiving technique, start/stop synchronization in RS232C will be described. An RS232C communication use a signal sequence including one start bit, a data bit sequence of 6 to 8 bits that follows the start bit, a parity bit, and a stop bit. In order to receive this signal sequence, a receiving circuit comprises a start bit detection unit, phase conversion unit, and data fetch unit. As an oscillator for reception, the receiving circuit comprises a sampling clock that operates at several MHz, a communication clock that approximately matches the data rate determined in the specification, and a sync clock which is synchronized with a signal outside a receiving apparatus (for example, see JP-A 2003-348059 [KOKAI]).

A general signal receiving sequence in RS232C is as follows. If a signal of 1200 bps is input as receiving data, the start bit detection unit detects an input of a start bit by a sampling clock. The phase conversion unit is controlled based on this detection result to convert the phase of a 1200-Hz communication clock to an optimal value. In this phase state, a data bit sequence, parity bit, and stop bit that follow the start bit are received. The received data sequence is temporarily stored in a buffer, and is handled as a data signal by a sync clock.

In the related art, as described above, the receiving apparatus requires a plurality of high-precision clock signals, resulting in increases in circuit scale, consumption power, and cost. Even when a plurality of clocks are combined into one, this clock is required to have high precision, and expensive external components with a large size such as a temperature-compensated quartz oscillator and the like are required.

In this way, the conventional asynchronous signal receiving technique requires a high-precision apparatus as clocks of a receiving system to attain start/stop synchronization, thus posing problems of increases in cost, apparatus scale, and consumption power.

BRIEF SUMMARY OF THE INVENTION

In accordance with a aspect of the invention, there is provided a receiving apparatus comprising: an input terminal configured to input a data sequence; an oscillation unit configured to oscillate at an oscillation frequency not less than a bit rate of the data sequence; a detection unit configured to detect a specific bit sequence included in the data sequence; a count unit configured to count, as a count value $n_1$, a first number of oscillations of the oscillation unit during a 1-bit-wide period of a first bit of the specific bit sequence, and to count, as a count value $n_2$, a second number of oscillations of the oscillation unit during a 1-bit-wide period of a second bit of the specific bit sequence; a count value determination unit configured to determine whether or not the count value $n_1$ is not less than a count value $(n_2-a)$ and is not more than a count value $(n_2+a)$ (a is a natural number); a generation unit configured to generate, when it is determined that the count value $n_1$ is not less than the count value $(n_2-a)$ and is not more than the count value $(n_2+a)$, a timing of $n_1/2$, fractions of which are carried, for the first bit to a third bit of the specific bit sequence, and to generate a timing of $n_1$ for a fourth bit and subsequent bits; and an acquisition unit configured to acquire a data sequence from the data sequence at the timing $n_1/2$ and the timing $n_1$ as an acquired data sequence.

In accordance with another aspect of the invention, there is provided a receiving apparatus, which includes a signal determination unit configured to input a first data sequence and to determine whether or not the first data sequence is a desired data sequence, and a main unit configured to acquire a determination result of the signal determination unit, the signal determination unit comprising: a first input terminal configured to input the first data sequence; a second input terminal configured to input an oscillation signal; a detection unit configured to detect a specific bit sequence included in the first data sequence; a count unit configured to count, as a count value $n_1$, a first number of oscillations of the oscillation signal during a 1-bit-wide period of a first bit of the specific bit sequence, and to count, as a count value $n_2$, a second number of oscillations of the oscillation signal during a 1-bit-wide period of a second bit of the specific bit sequence; a count value determination unit configured to determine whether or not the count value $n_1$ is not less than a count value $(n_2-a)$ and is not more than a count value $(n_2+a)$ (a is a natural number); a generation unit configured to generate, when it is determined that the count value $n_1$ is not less than the count value $(n_2-a)$ and is not more than the count value $(n_2+a)$, a timing of $n_1/2$, fractions of which are carried, for a least significant bit of the first data sequence, and to generate a timing of $n_1$ for bits after the least significant bit; an acquisition unit configured to acquire a data sequence from the first data sequence at the timing $n_1/2$ and the timing $n_1$ as an acquired data sequence; a storage unit configured to store a second data sequence which is set in advance; a data sequence determination unit configured to determine whether or not the second data sequence matches the acquired data sequence; and an output unit configured to output, when it is determined that the second data sequence matches the acquired data sequence, this determination result of the data sequence determination unit, the receiving apparatus further comprising: a first power supply; a first oscillation unit configured to oscillate at an oscillation frequency not less than a bit rate of the first data sequence; and a first control unit configured to control power supply from the first power supply to the signal determination unit and the first oscillation unit, and the main unit comprising: a receiving unit configured to receive the first data sequence; a second oscillation unit configured to oscillate at an oscillation frequency not less than a bit rate of the first data sequence; a second power supply; a second control unit configured to control power supply from the second power supply to the receiving unit and the second oscillation unit; and a transmission unit configured to transmit information indicating whether or not to supply power to the receiving unit and the second oscillation unit to the first control unit, wherein the first control unit supplies power or shuts off power supply according to the information.

DETAILED DESCRIPTION OF THE INVENTION

A receiving apparatus and method according to embodiments of the present invention will be described in detail hereinafter with reference to the drawings. Note that in the following embodiments, components denoted by the same reference numbers perform the same operations, and a repetitive description thereof will be avoided.

According to a receiving apparatus and method of this embodiment, the cost is low, the apparatus scale is small, and consumption power is prevented from increasing by using clocks of a receiving system to attain start/stop synchronization.

First Embodiment

Figure 1:
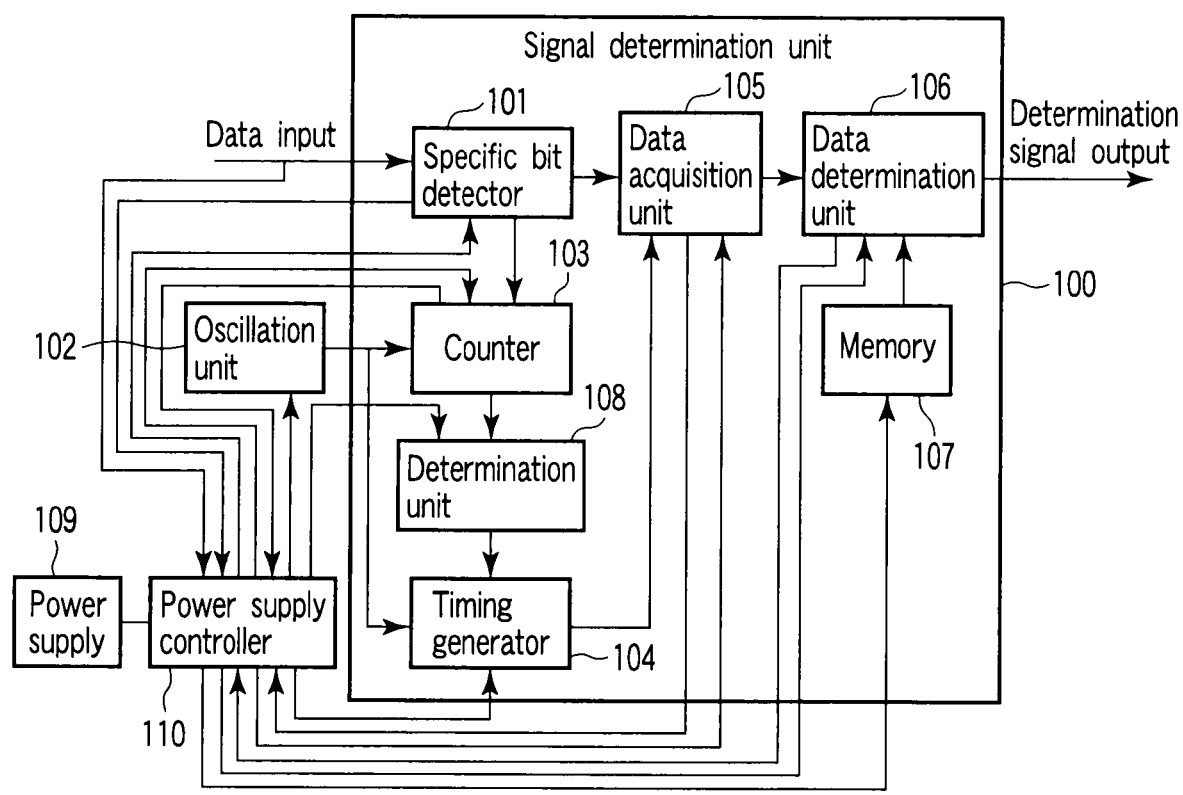
FIG. 1 is a block diagram of a receiving apparatus of the first embodiment.

A receiving apparatus of the first embodiment will be described below with reference to FIG. 1.

The receiving apparatus of this embodiment includes a signal determination unit 100, oscillation unit 102, power supply 109, and power supply controller 110. The signal determination unit 100 includes a specific bit detector 101, counter 103, timing generator 104, data acquisition unit 105, data determination unit 106, memory 107, and checking unit 108. A data input terminal is connected to the specific bit detector 101, and the oscillation unit 102 is connected to the counter 103 and timing generator 104.

The specific bit detector 101 receives a data sequence via the data input terminal, and detects if the data sequence includes specific bits. When the detector 101 determines that the data sequence includes the specific bits, it outputs a waveform according to the specific bits to the counter 103. The specific bits are allocated at, e.g., the head of the data sequence. Furthermore, when the specific bit detector 101 determines that the data sequence includes the specific bits, it passes the data sequence input via the data input terminal to the data acquisition unit 105. When the specific bit detector 101 determines that the data sequence includes the specific bits, it notifies the power supply controller 110 of that detection result.

The specific bits include, for example, a first bit="1" and second bit="0". Alternatively, the specific bits include a first bit="0" and second bit="1". Also, the specific bits may include first, second, and third bits="1", "0", and "1", or "0", "1", and "0". Note that the specific bits may be Manchester-encoded. The Manchester encoding will be described in the end of this embodiment.

The oscillation unit 102 outputs a clock signal at an oscillation frequency of a certain value. This oscillation frequency is set to be larger than the bit rate of the data sequence which is input by the specific bit detector 101. In other words, the input data sequence is a sequence shorter than a value (i.e., a count value $n_1$) obtained by dividing the oscillation frequency of the oscillation unit 102 by the bit rate of this data sequence. Within this range, the count value is free from any error, and the receiving apparatus can operate normally.

The counter 103 counts the number of oscillations of the oscillation unit 102 during a first 1-bit-wide period of the specific bit sequence output from the specific bit detector 101. Also, the counter 103 counts the number of oscillations of the oscillation unit 102 during a second 1-bit-wide period in the specific bit sequence.

The checking unit 108 compares a count value $n_1$ during the first 1-bit-wide period in the specific bit sequence, and a count value $n_2$ during the second 1-bit-wide period in the specific bit sequence. If $(n_2-a) \leq n_1 \leq (n_2+a)$ (a is a natural number), the unit 108 determines true, and starts collection of the subsequent data sequence. Note that the value a is a natural number which meets $0 \leq a \leq n_1 \times 0.2$, and $n_1 \times 0.2$ means that an error of 20% of $n_1$ is allowable.

The timing generator 104 decides the collection timing of the data sequence signal based on the value $n_1$ calculated by the counter 103.

The data acquisition unit 105 collects the data sequence input by the specific bit detector 101 at the timing generated by the timing generator 104.

The memory 107 stores a predetermined data sequence in advance. This data sequence can be used as a unique data sequence serving as an ID (identification information).

The data determination unit 106 determines if the data sequence acquired by the data acquisition unit 105 matches that stored in the memory 107, and outputs the determination result.

The power supply controller 110 is connected to the power supply 109, and controls power supply to the respective units included in the signal determination unit 100 and to the oscillation unit 102. That is, the power supply controller 110 determines if power is to be supplied to each unit. If it is determined that power is to be supplied to that unit, the power supply controller 110 supplies power to the unit. Note that power is always supplied to the oscillation unit 102.

More specifically, the power supply controller 110 is connected to the data input terminal of the specific bit detector 101, and monitors if a data sequence is input to the signal determination unit 100. When the data sequence is input, the power supply controller 110 supplies power to the specific bit detector 101. When the specific bit detector 101 detects a specific bit sequence, the power supply controller 110 receives a detection message from the specific bit detector 101, and supplies power to the counter 103, timing generator 104, and checking unit 108. Furthermore, the power supply controller 110 acquires the count result of the specific bit sequence from the counter 103, and checks if this count result is normal. If the count result is normal, the power supply controller 110 supplies power to the data acquisition unit 105. The power supply controller 110 also checks if the data acquisition unit 105 has normally collected the data sequence. If it is determined that the data acquisition unit 105 has normally collected the data sequence, the power supply controller 110 supplies power to the data determination unit 106 and memory 107. In addition, upon receiving, from the data determination unit 106, a signal as its determination result indicating that the acquired data sequence does not match the data sequence stored in the memory 107, the power supply controller 110 shuts off power to the counter 103, checking unit 108, timing generator 104, data acquisition unit 105, data determination unit 106, and memory 107.

The operation of the receiving apparatus shown in FIG. 1 will be described below with reference to the timing charts of FIGS. 2A to 2I.

Figure 2:
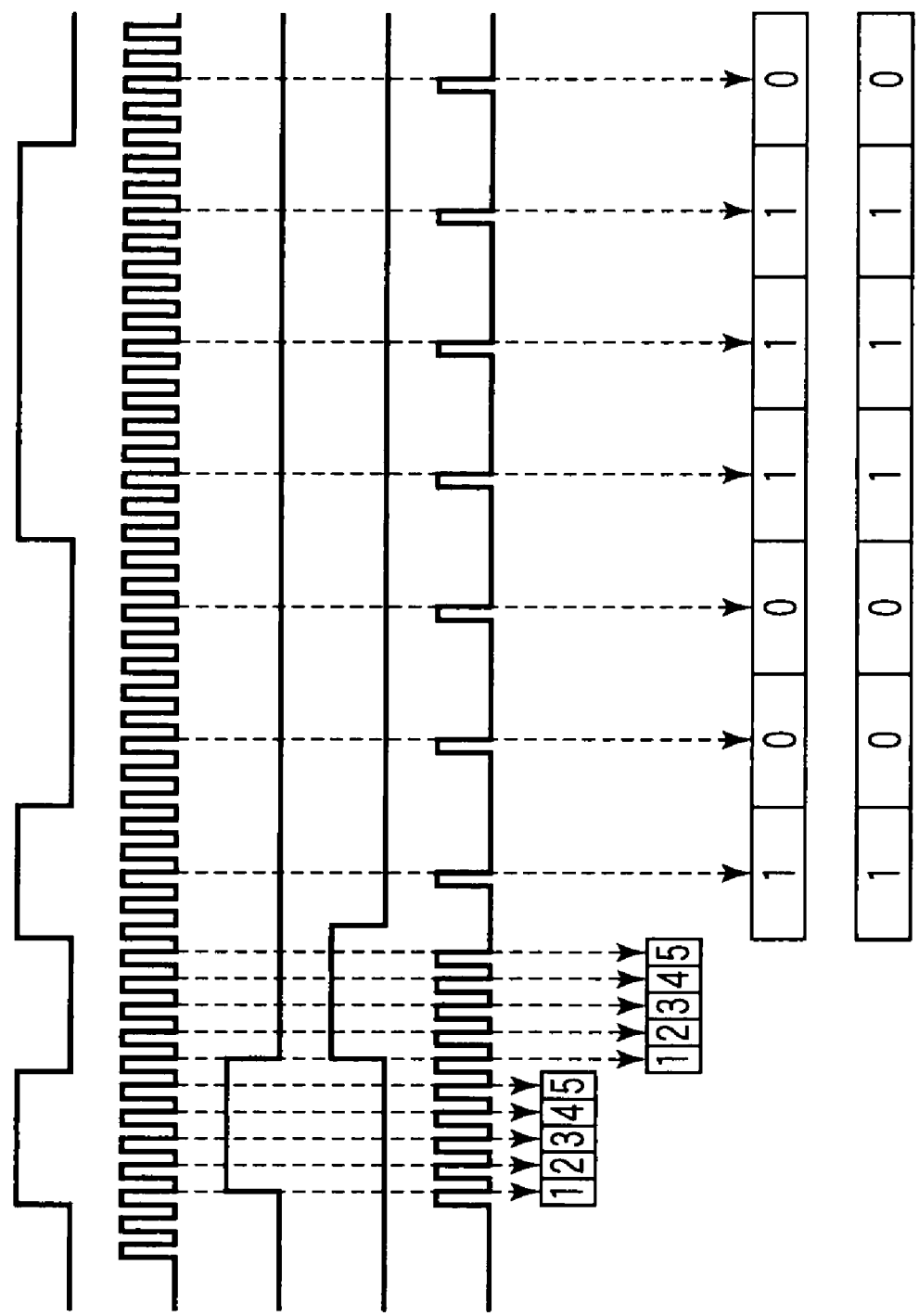
FIGS. 2A to 2I are timing charts for explaining the operation of the receiving apparatus shown in FIG. 1.

FIG. 2A shows an input signal example input by the specific bit detector 101. FIG. 2B shows a clock signal output from the oscillation unit 102. FIGS. 2C and 2D show detection result output signals of the specific bit detector 101, which are output from the specific bit detector 101 and input to the counter 103. FIG. 2E shows an output timing signal output from the timing generator 104. FIGS. 2F and 2G show count data sequences output from the counter 103. FIG. 2H shows a data sequence of a receiving signal collected by the data acquisition unit 105. FIG. 2I shows the data sequence stored in the memory 107.

Assume that, as the format of a signal input by the specific bit detector 101, specific bit data includes a specific bit sequence as first three bits "1", "0", and "1", as shown in FIG. 2A. As for a receiving signal input from the data input terminal, the specific bit detector 101 detects the leading edge of the first bit "1", outputs a waveform shown in FIG. 2C, and makes the counter 103 start counting. The counter 103 keeps counting the clock signals from the oscillation unit 102 until the specific bit detector 101 detects the trailing edge of the next bit "0", and holds the result. In this case, the count value is "5", as shown in FIG. 2F.

Upon detection of the next bit "0", the specific bit detector 101 outputs a waveform shown in FIG. 2D again, and the counter 103 begins to count the clock signals from the oscillation unit 102. The counter 103 keeps counting until the specific bit detector 101 detects the leading edge of the next bit "1", and holds the result. In this case, the count value is "5", as shown in FIG. 2G.

The checking unit 108 compares the count value $n_1$ shown in FIG. 2F, and the count value $n_2$ shown in FIG. 2G. If $(n_2-a) \leq n_1 \leq (n_2+a)$, the checking unit 108 determines true, and starts collection of the subsequent data sequence. In this case, since $n_1=5$ and $n_2=5$, the unit 108 determines true.

The next bit is "1" as the third bit of the specific bit sequence, and the timing generator 104 generates a timing of a value $n_1/2$, fractions of which are carried, with respect to the counter value $n_1$. The data acquisition unit 105 collects the data sequence input by the specific bit detector 101 at this timing. In this case, since $n_1=5$, the data acquisition unit 105 collects the data sequence to obtain data "1" at a timing after three counts. For the subsequent data sequence, the timing generator 104 generates a timing of the counter value $n_1$, and the data acquisition unit 105 collects the data sequence at this timing. In this case, since $n_1=5$, the data acquisition unit 105 collects data to obtain data "0" at a timing after five counts. That is, the data acquisition unit 105 collects data at the timing of $n_1/2$, fractions of which are carried, for the first to third bits of the specific bit sequence, and collects data at the timing of $n_1$ for the fourth bit and subsequent bits.

Subsequently, the data acquisition unit 105 continues the data sequence collection at the timings of the counter value $n_1$ until the prescribed number of data bits is reached or a data end code is received. In the example of FIGS. 2A to 2I, the data acquisition unit 105 acquires a data sequence of "1", "0", "0", "1", "1", "1", and "0" as well as the third bit of the specific bit sequence as the data sequence. FIG. 2I shows the data sequence which is stored in advance in the memory 107. This data sequence can be used as a unique data sequence serving as an ID or the like. In this example, the data sequence includes "1", "0", "0", "1", "1", "1", and "0". The data determination unit 106 compares and determines if the data sequence in FIG. 2H matches that in FIG. 2I, and outputs data "1" and the like if it obtains a result "true". That is, the data determination unit 106 determines true when a plurality of repetition signals (seven repetition signals in this example) match a data sequence as a plurality of repetition signals stored in the memory.

Figure 3:
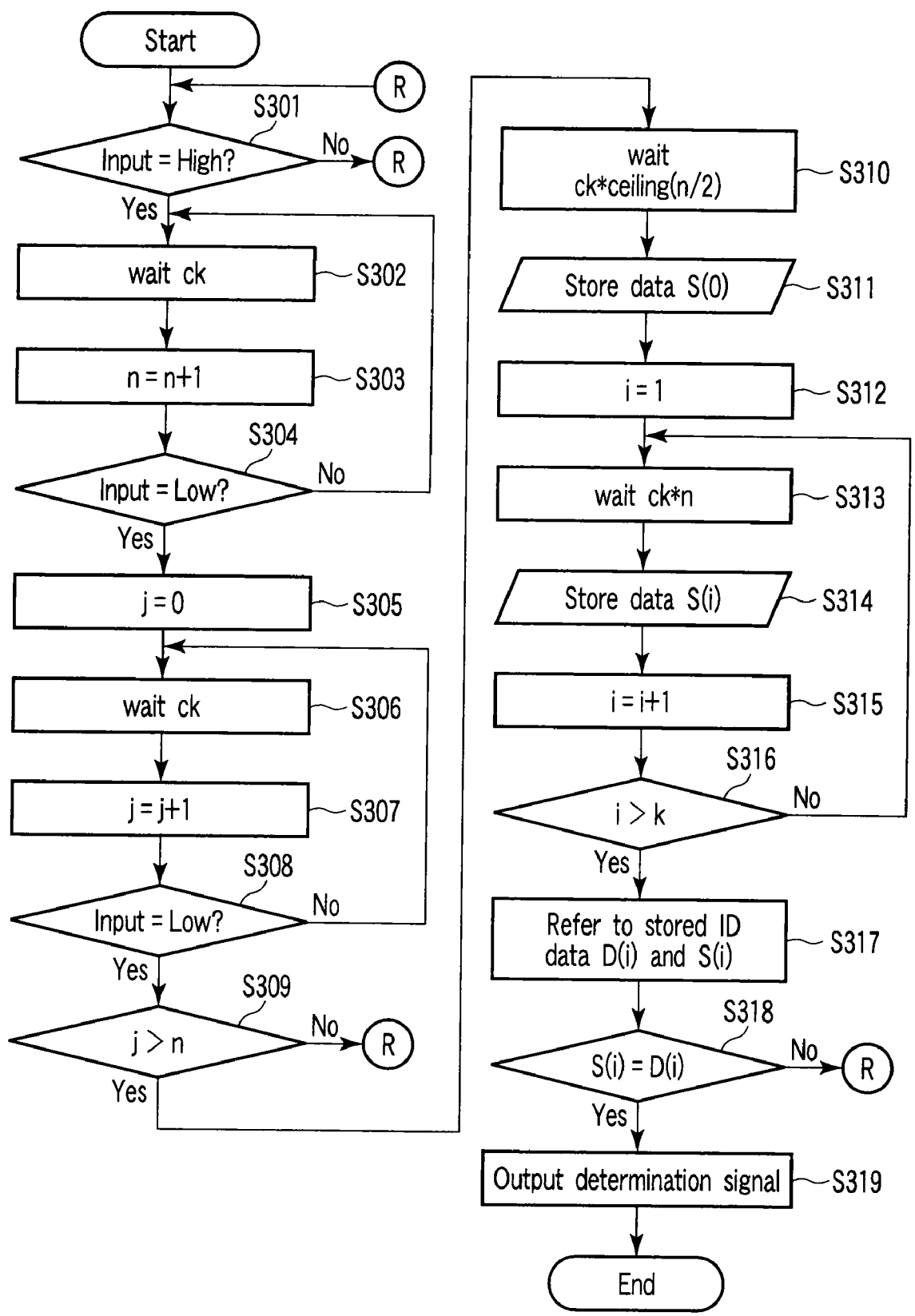
FIG. 3 is a flowchart showing an example of the operation of the receiving apparatus shown in FIG. 1.

An example of the operation of the receiving apparatus shown in FIG. 1 will be described below with reference to FIG. 3. Assume that the specific bit sequence includes signals "1", "0", and "1".

At the time of start, the specific bit detector 101 and oscillation unit 102 receive power. If the specific bit detector 101 detects an input signal is high, the process advances to step S302; otherwise, the process advances to "R" to end this processing or to start another processing (step S301). If the specific bit detector 101 detects that an input signal is not high, the process returns to "start". If the specific bit detector 101 detects that an input signal is high, the control waits for one clock period of the oscillation unit 102 (step S302), and the count value n of the counter 103 is incremented to n+1 (step S303). If an input signal of the specific bit detector 101 is Low at this timing, the process advances to step S305; otherwise, the process returns to step S302 (step S304). By repeating a loop from step S302 to step S304, the counter 103 obtains the count value n corresponding to the bit width for one bit of an input signal.

If an input signal is Low, the data state is examined count by count during the count value n collected by the counter 103, so as to verify reception of "0" as the second bit of the specific bit sequence. In order to count the second bit of the specific bit sequence, the counter 103 resets a counter j to zero (step S305), the control waits for one clock period of the oscillation unit 102 (step S306), and a count value j of the counter 103 is incremented to j+1 (step S307). If an input signal of the specific bit detector 101 is Low at this timing, the process advances to step S309; otherwise, the process returns to step S306 (step S308). If the input changes from Low before the count value n is reached, the checking unit 108 decides that the specific bit sequence is not a desired signal, and the process is reset to "start", i.e., it returns to step S301 (step S309). If the input is kept Low until the count value n is reached, the checking unit 108 decides that the specific bit sequence includes desired bits, and the process advances to step S310 (step S309).

If it is determined that the specific bit sequence includes desired bits, in order to collect "1" as the third bit of the specific bit sequence, the control waits for a time period as the product of a value obtained by carrying fractions of n/2 with respect to the count value n and one clock period of the oscillation unit 102 (step S310), and the value of the data sequence at that time is stored as S(0) (step S311). Note that the timing generator 104 calculates this waiting time period.

After that, letting k be a predetermined number of signal bits, data of the data sequence is collected as S(i) at a period of the count n until an argument i reaches k (steps S312 to S316). The data determination unit 106 compares the collected data sequence S(i) with an ID data sequence D(i) stored in the memory 107 with reference to these data sequences (step S317), and determines if these data sequences match (step S318). If the two data sequences match, the data determination unit 106 outputs a determination signal (step S319); otherwise, it determines that the collected data sequence is not a desired signal, and the process is reset to "start".

As a signal receiving method in a system which suffers an interference signal due to transmission signals and the like from other signal sources, the receiving apparatus according to the method of this embodiment can acquire data more reliably by repetitively transmitting an identical data sequence a plurality of times. In this case, the bit rate of the data sequence repeated a plurality of times may be changed for respective packets, thus allowing easy discrimination from other signals.

Furthermore, in order to determine a bit "0" of a transmission signal or a non-signal state, encoding such as so-called Manchester-encoding or the like in which a 1-bit signal is divided into two, a signal including a high level for the former half and a low level for the latter half is encoded as data "0", and a signal including a low level for the former half and a high level for the latter half is encoded as data "1", may be used. With such encoding, a non-signal state is eliminated, and a signal-off state can be detected. Note that the Manchester-encoding is merely an example, and the same applies to use of other encoding methods such as Miller encoding, RZ, and the like.

According to the aforementioned first embodiment, signal reception using the oscillation unit 102, which is not related to the data rate of an input data sequence, can be implemented by a simple method. Since the oscillation unit 102 need only receive signals of a short data sequence, the need for a high-precision quartz oscillator and the like can be obviated, and the need for temperature compensation and oscillation frequency control can also be obviated. Therefore, this embodiment can be implemented using a very simple oscillator. That is, this embodiment can be implemented using a 1-chip IC that does not require any external components, and the cost, implementation area, and consumption power can be reduced.

Second Embodiment

Figure 4:
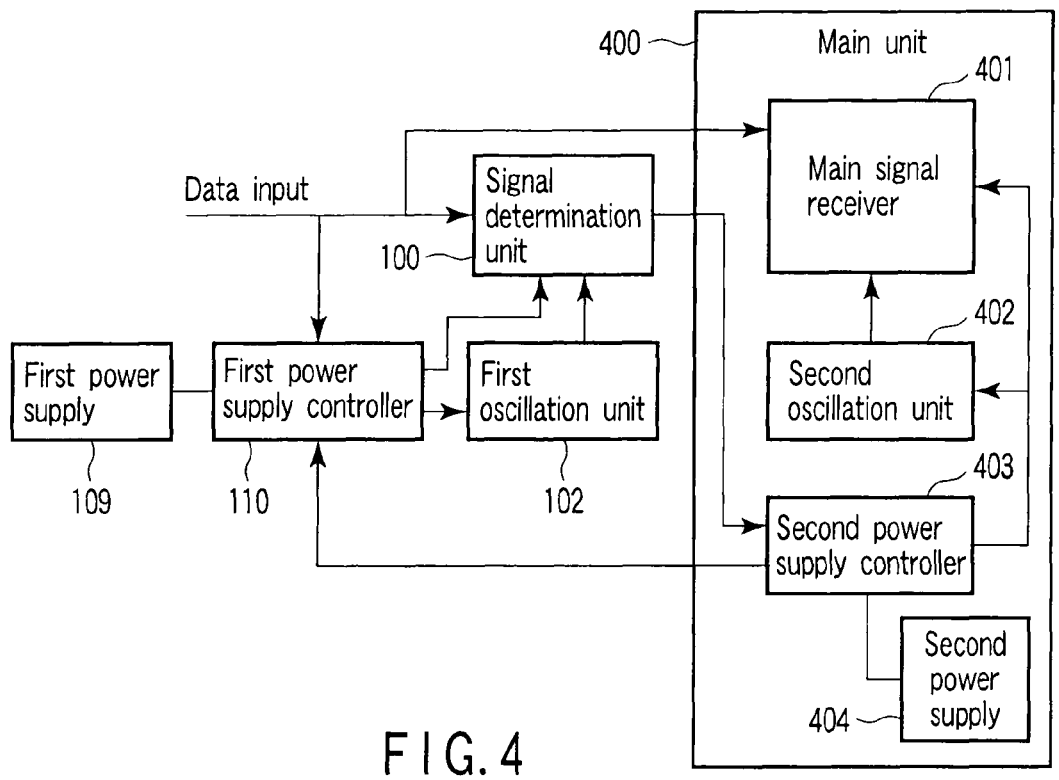
FIG. 4 is a block diagram of a receiving apparatus of the second embodiment.

A receiving apparatus according to the second embodiment will be described below with reference to FIG. 4.

The receiving apparatus of this embodiment includes a signal determination unit 100, first oscillation unit 102, first power supply 109, first power supply controller 110, and main unit 400. The main unit 400 includes a main signal receiver 401, second oscillation unit 402, second power supply controller 403, and second power supply 404. A data signal is input to the signal determination unit 100 shown in FIG. 1, which supplies a determination result to the main unit 400. The signal determination unit 100 receives power from the first power supply controller 110, and receives clock signals from the first oscillation unit 102.

When a data signal is input to the signal determination unit 100, the signal determination unit 100 determines the signal based on the first oscillation unit 102, which has no correlation with the data rate, according to the procedures described in the first embodiment. At this time, the first power supply controller 110 supplies power from the first power supply 109 to the signal determination unit 100 and first oscillation unit 102.

When the data signal input to the signal determination unit 100 is a desired signal, the signal determination unit 100 passes a specific output signal to the main unit 400. When the signal determination unit 100 receives a desired signal, it outputs, as the output signal, for example, a signal that changes from "0" to "1".

The main unit 400 is, for example, a television receiver.

The second oscillation unit 402 outputs a clock signal at an oscillation frequency of a certain value to the main signal receiver 401.

The second power supply controller 403 is connected to the second power supply 404, and controls power supply from the second power supply 404 to the main signal receiver 401 and second oscillation unit 402. That is, the second power supply controller 403 determines whether or not to supply power to each unit. When the second power supply controller 403 determines to supply power, it supplies power to that unit. For example, when the signal determination unit 100 receives a signal for turning on the main unit 400 as a desired signal, it outputs a signal that changes from "0" to "1". When the second power supply controller 403 receives this signal, and determines that the signal changes from "0" to "1", it starts power supply to the main signal receiver 401 and second oscillation unit 402. In order to turn off the main unit 400, for example, the signal determination unit 100 outputs a signal that changes from "1" to "0" to the second power supply controller 403, which stops power supply to the main signal receiver 401 and second oscillation unit 402.

As a result, the second power supply controller 403 supplies power to the main signal receiver and second oscillation unit of the main unit 400, which is set in a power-off state so far. After that, the entire main unit 400 is activated.

At this time, the second power supply controller 403 supplies a signal indicating that the main unit 400 is activated to the first power supply controller 110. Upon reception of this signal, the first power supply controller 110 stops power supply to the signal determination unit 100 and first oscillation unit 102.

When the first power supply 109 is a secondary battery, the second power supply controller 403 supplies power for charging from the second power supply 404 to the first power supply 109 via the first power supply controller 110 when the main unit 400 is turned on. As a result, a decrease in charged amount due to power consumption of the first power supply 109 can be recovered.

The main signal receiver 401 receives a signal from the data input terminal, and applies predetermined signal processing. A signal received by the main signal receiver 401 is, for example, an ultra-high speed signal that can process a large-capacity signal at high speed, or a multiplexed signal. Upon reception of signal end data or the like, the main signal receiver may output a signal that advises accordingly to the second power supply controller 403, which may automatically shut off the power supply, thereby setting the main unit in a power-off state. At this time, the second power supply controller 403 supplies this power-off signal to the first power supply controller 110, which supplies power to the signal determination unit 100 and first oscillation unit 102 to turn them on.

According to the aforementioned second embodiment, the power supply of the main unit which normally requires large consumption power can be turned off during a period in which no signal addressed to that main unit is received, and the signal determination unit which requires small consumption power is activated to wait for the signal addressed to the main unit. On the other hand, the signal determination unit can supply power to the first power supply when the main unit is on. For example, when the first power supply is a battery, the need for battery change can be obviated, and high economic efficiency and elimination of inconvenience can be attained. That is, power savings upon waiting for signals can be implemented by a very simple arrangement.

Third Embodiment

Figure 5:
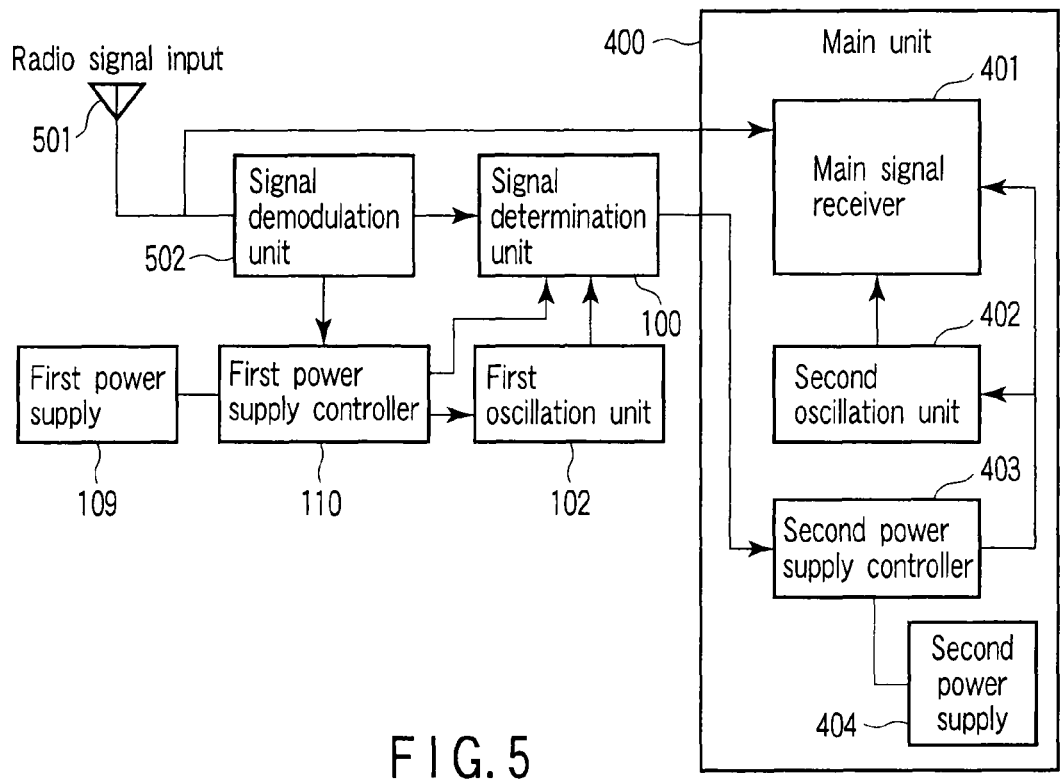
FIG. 5 is a block diagram of a receiving apparatus of the third embodiment.

A receiving apparatus according to the third embodiment will be described below with reference to FIG. 5.

The receiving apparatus of this embodiment includes an antenna 501, signal demodulation unit 502, signal determination unit 100, first oscillation unit 102, first power supply 109, first power supply controller 110, and main unit 400.

The signal demodulation unit 502 demodulates a radio signal received via the antenna 501 to a digital signal, and passes the demodulated signal to the signal determination unit 100. A main signal receiver 401 also receives a radio signal via the antenna 501.

Other components are the same as those in the first and second embodiments. That is, a signal determination result of a data signal input to the signal determination unit 100 is supplied to the main unit 400. The signal determination unit receives power from the first power supply controller 110, and receives clock signals from the first oscillation unit 102.

When a radio signal is input to the antenna 501, the signal determination unit 100 determines the signal based on the first oscillation unit 102, which has no correlation with the data rate, in accordance with the procedures described in the first embodiment. At this time, the first power supply controller 110 supplies power to the signal determination unit 100 and first oscillation unit 102. When the input data signal is a desired signal, the signal determination unit 100 determines true, and changes its output from "0" to "1". The main unit 400 receives this result, and a second power supply controller 403 begins to supply power to the main signal receiver 401 and a second oscillation unit 402.

As a result, in the main unit 400 which is set in a power-off state so far, the second power supply controller 403 starts power supply to supply power to the main signal receiver 401 and second oscillation unit 402. After that, the entire main unit 400 is activated, and the main signal receiver 401 applies signal processing to a radio signal input via the antenna.

A signal received by the main signal receiver 401 includes a wireless LAN signal, and signals of an RFID, sensor network, and the like, which can process a large-capacity radio signal at high speed. When the main signal receiver 401 receives signal end data or the like, the second power supply controller 403 automatically shuts off the power, thus setting the main unit 400 in a power-off state.

According to the aforementioned third embodiment, the power supply of the main unit which normally requires large consumption power can be turned off during a period in which no signal addressed to that main unit is received, and the signal determination unit which requires small consumption power is activated to wait for the signal addressed to the main unit. That is, power savings upon waiting for signals can be implemented by a very simple arrangement.

According to the aforementioned embodiments, a signal can be received by a simple method using an oscillator which is quite different from the bit rate of a data sequence to be received. As a result, the need for an expensive quartz oscillator can be obviated, and a receiver can be configured using one chip that mounts a simple oscillator which does not require any external components, and in which a complicated temperature compensation circuit and the like are omitted. That is, an asynchronously input data sequence can be received using a simple clock source as clocks of a receiving system, so as to attain start/stop synchronization. As a result, the cost and apparatus scale can be reduced, and consumption power can be prevented from increasing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A receiving apparatus comprising:
   an input terminal configured to input a data sequence;
   an oscillation unit configured to oscillate at an oscillation frequency not less than a bit rate of the data sequence;
   a detection unit configured to detect a specific bit sequence included in the data sequence;
   a count unit configured to count, as a count value $n_1$, a first number of oscillations of the oscillation unit during a 1-bit-wide period of a first bit of the specific bit sequence, and to count, as a count value $n_2$, a second number of oscillations of the oscillation unit during a 1-bit-wide period of a second bit of the specific bit sequence;
   a count value determination unit configured to determine whether or not the count value $n_1$ is greater than or equal to a count value $(n_2-a)$ and is less than or equal to a count value $(n_2+a)$, where a is a non-zero natural number;
   a generation unit configured to generate, when it is determined that the count value $n_1$ is greater than or equal to the count value $(n_2-a)$ and is less than or equal to the count value $(n_2+a)$, a timing of $n_1/2$, fractions of which are carried, for the first bit to a third bit of the specific bit sequence, and to generate a timing of $n_1$ for a fourth bit and subsequent bits; and
   an acquisition unit configured to acquire a data sequence from the data sequence at the timing $n_1/2$ and the timing $n_1$ as an acquired data sequence.

2. The apparatus according to claim 1, wherein the first bit and the second bit of the specific bit sequence are respectively "1" and "0" or "0" and "1".

3. The apparatus according to claim 1, wherein the first bit, the second bit, and the third bit of the specific bit sequence are respectively "1", "0", and "1", or "0", "1", and "0".

4. The apparatus according to claim 1, wherein the specific bit sequence is Manchester-encoded.

5. The apparatus according to claim 1, wherein a number of bits of the data sequence input via the input terminal corresponds to a number of bits of a sequence shorter than the count value $n_1$.

6. The apparatus according to claim 1, wherein the specific bit sequence is allocated at a head of the data sequence.

7. The apparatus according to claim 1, further comprising:
   a storage unit configured to store a data sequence which is set in advance;
   a data sequence determination unit configured to determine whether or not the data sequence stored in the storage unit matches the acquired data sequence; and
   an output unit configured to output, when it is determined that the data sequence stored in the storage unit matches the acquired data sequence, a determination result of the data sequence determination unit.

8. The apparatus according to claim 7, wherein the storage unit stores the data sequence as identification information.

9. The apparatus according to claim 7, further comprising:
   a power supply; and
   a control unit configured to control power supplied to and connect the oscillation unit, the count unit, the count value determination unit, the generation unit, the acquisition unit, the storage unit, the data sequence determination unit, the output unit, and the power supply, and
   wherein the control unit is further configured to supply power to the count unit, the count value determination unit, and the generation unit when the detection unit detects the specific bit sequence, to the acquisition unit when the count value determination unit determines that the count value $n_1$ is greater than or equal to the count value $(n_2-a)$ and is less than or equal to the count value $(n_2+a)$, and to the storage unit, the data sequence determination unit, and the output unit when the acquisition unit acquires the acquired data sequence, and the control unit shuts off power supply to the count unit, the count value determination unit, the generation unit, the acquisition unit, the storage unit, the data sequence determination unit, and the output unit when it is determined that the data sequence stored in the storage unit fails to match the acquired data sequence.

10. The apparatus according to claim 7, wherein the data sequence input via the input terminal is a data sequence of plural-time repetition signals as well as the specific bit sequence, the data sequence determination unit determines whether or not the data sequence of the plural-time repetition signals matches the data sequence stored in the storage unit, and the output unit outputs the determination result when the data sequence of the plural-time repetition signals matches the data sequence stored in the storage unit.

11. The apparatus according to claim 1, wherein a is a non-zero natural number which satisfies $0<a \leqq n_1 \times 0.2$.

12. A receiving apparatus, comprising:

a signal determination unit configured to input a first data sequence and to determine whether or not the first data sequence is a desired data sequence; and a main unit configured to acquire a determination result of the signal determination unit, the signal determination unit comprising a first input terminal configured to input the first data sequence, a second input terminal configured to input an oscillation signal, a detection unit configured to detect a specific bit sequence included in the first data sequence, a count unit configured to count, as a count value $n_1$, a first number of oscillations of the oscillation signal during a 1-bit-wide period of a first bit of the specific bit sequence, and to count, as a count value $n_2$, a second number of oscillations of the oscillation signal during a 1-bit-wide period of a second bit of the specific bit sequence, a count value determination unit configured to determine whether or not the count value $n_1$ is greater than or equal to a count value $(n_2-a)$ and is less than or equal to a count value $(n_2+a)$, where a is a non-zero natural number, a generation unit configured to generate, when it is determined that the count value $n_1$ is greater than or equal to the count value $(n_2-a)$ and is less than or equal to the count value $(n_2+a)$, a timing of $n_1/2$, fractions of which are carried, for a least significant bit of the first data sequence, and to generate a timing of $n_1$ for bits after the least significant bit, an acquisition unit configured to acquire a data sequence from the first data sequence at the timing $n_1/2$ and the timing $n_1$ as an acquired data sequence, a storage unit configured to store a second data sequence which is set in advance, a data sequence determination unit configured to determine whether or not the second data sequence matches the acquired data sequence, and an output unit configured to output, when it is determined that the second data sequence matches the acquired data sequence, a determination result of the data sequence determination unit, the receiving apparatus further comprising a first power supply, a first oscillation unit configured to oscillate at an oscillation frequency not less than a bit rate of the first data sequence, and a first control unit configured to control power supply from the first power supply to the signal determination unit and the first oscillation unit, and the main unit comprising a receiving unit configured to receive the first data sequence, a second oscillation unit configured to oscillate at an oscillation frequency not less than a bit rate of the first data sequence, a second power supply, a second control unit configured to control power supply from the second power supply to the receiving unit and the second oscillation unit, and a transmission unit configured to transmit information indicating whether or not to supply power to the receiving unit and the second oscillation unit to the first control unit, wherein the first control unit supplies power or shuts off power supply according to the information.

13. The apparatus according to claim 12, wherein when the second control unit supplies power, the first control unit receives the information and shuts off power supply, and when the second control unit shuts off power supply, the first control unit receives the information and supplies power.

14. The apparatus according to claim 12, wherein a is a non-zero natural number which satisfies $0<a \leqq n_1 \times 0.2$.

15. A receiving method comprising:

inputting a data sequence;

oscillating at an oscillation frequency not less than a bit rate of the data sequence;

detecting a specific bit sequence included in the data sequence;

counting, as a count value $n_1$, a first number of oscillations of the oscillating step during a 1-bit-wide period of a first bit of the specific bit sequence, and counting, as a count value $n_2$, a second number of oscillations of the oscillating step during a 1-bit-wide period of a second bit of the specific bit sequence;

determining whether or not the count value $n_1$ is greater than or equal to a count value $(n_2-a)$ and is less than or equal to a count value $(n_2+a)$, where a is a non-zero natural number, generating, when it is determined that the count value $n_1$ is greater than or equal to the count value $(n_2-a)$ and is less than or equal to the count value $(n_2+a)$, a timing of $n_1/2$, fractions of which are carried, for a least significant bit of the data sequence, and generating a timing of $n_1$ for bits after the least significant bit; and acquiring a data sequence from the data sequence at the timing as an acquired data sequence.

16. A receiving method used in a receiving apparatus including a signal determination unit configured to input a first data sequence and to determine whether or not the first data sequence is a desired data sequence, and a main unit configured to acquire a determination result of the signal determination unit, comprising:

a method of the signal determination unit including
  inputting a data sequence,
  inputting an oscillation signal,
  detecting a specific bit sequence included in the first data sequence,
  counting, as a count value $n_1$, a first number of oscillations of the oscillation signal during a 1-bit-wide period of a first bit of the specific bit sequence, and
  counting, as a count value $n_2$, a second number of oscillations of the oscillation signal during a 1-bit-wide period of a second bit of the specific bit sequence,
  determining whether or not the count value $n_1$ is greater than or equal to a count value $(n_2-a)$ and is less than or equal to a count value $(n_2+a)$ where a is a natural number, generating, when it is determined that the count value $n_1$ is greater than or equal to the count value $(n_2-a)$ and is less than or equal to the count value $(n_2+a)$, a timing of $n_1/2$, fractions of which are carried, for a least significant bit of the first data sequence, and generating a timing of $n_1$ for bits after the least significant bit, acquiring a data sequence from the first data sequence at the timing $n_1/2$ and the timing $n_1$ as an acquired data sequence, preparing a storage unit which stores a second data sequence that is set in advance, determining whether or not the second data sequence matches the acquired data sequence, and outputting, when it is determined that the second data sequence matches the acquired data sequence, a determination result; and a method of the receiving apparatus including preparing a first power supply, preparing a first oscillation unit which oscillates at an oscillation frequency not less than a bit rate of the first data sequence, and preparing a control unit which controls power supply from the first power supply to the signal determination unit and the first oscillation unit; and a method of the main unit including preparing a receiving unit which receives the first data sequence, preparing a second oscillation unit which oscillates at an oscillation frequency not less than a bit rate of the first data sequence, preparing a second power supply, controlling power supply from the second power supply to the receiving unit and the second oscillation unit, and transmitting information indicating whether or not to supply power to the receiving unit and the second oscillation unit to the control unit, wherein the control unit supplies power or shuts off power supply according to the information.

* * * * *